May 3, 1960 M. R. ESTABROOK 2,934,978
POSITIONING SYSTEM FOR MACHINE TOOLS
Filed May 7, 1958 3 Sheets-Sheet 2

INVENTOR
Mark R. Estabrook
By Carlson, Pitzner, Hubbard & Wolfe
ATTORNEYS

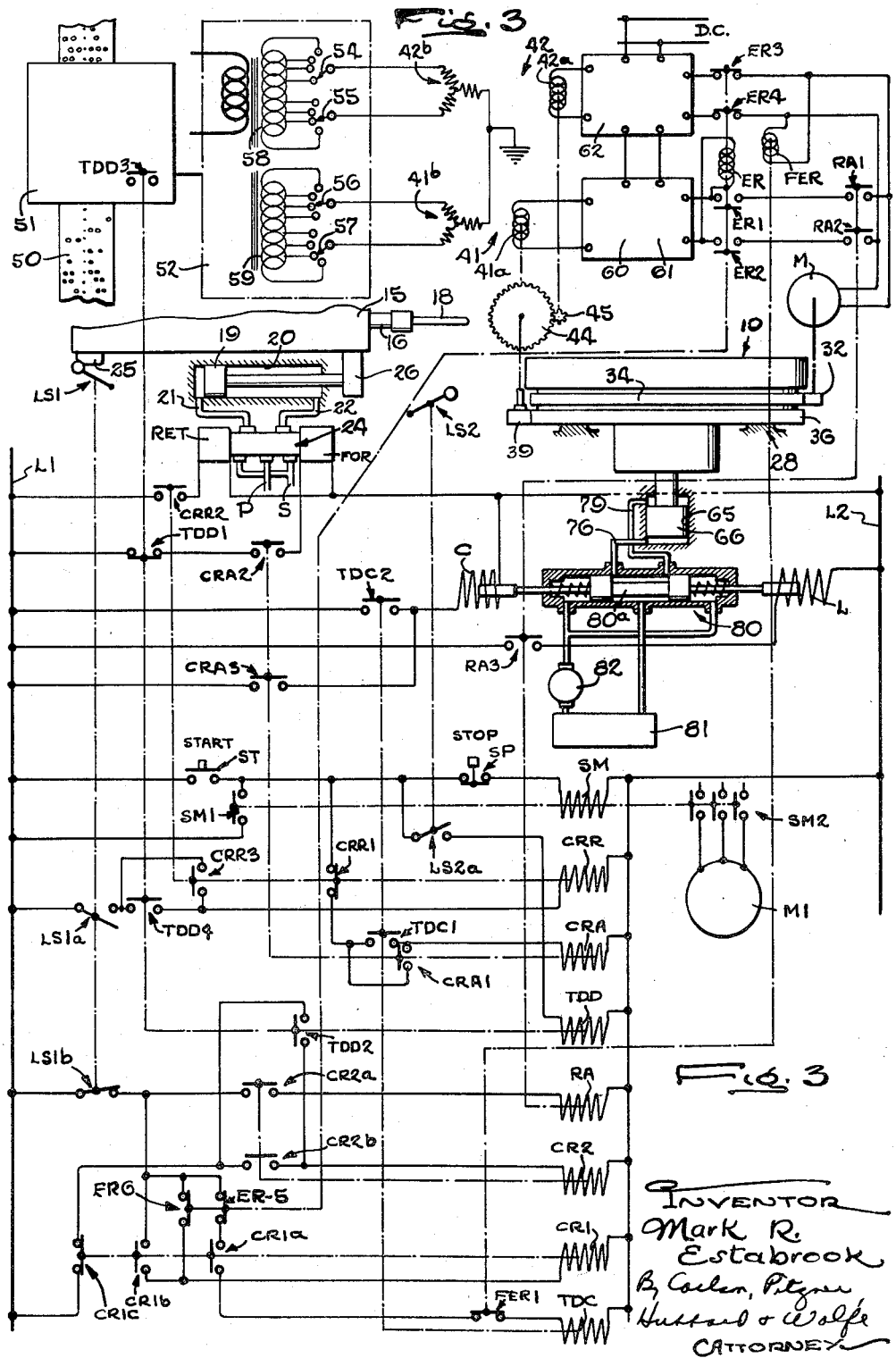

United States Patent Office 2,934,978
Patented May 3, 1960

2,934,978

POSITIONING SYSTEM FOR MACHINE TOOLS

Mark R. Estabrook, Rockford, Ill., assignor to Barnes Drill Co., Rockford, Ill., a corporation of Illinois Application May 7, 1958, Serial No. 733,578

15 Claims. (Cl. 77—32.2)

This invention relates in general to machine tools and in particular to the positioning of movable, massive machine tool elements, for example, rotationally indexable work-supporting tables.

The general aim of the invention is to improve the speed and precision with which a massive machine tool element is brought to a desired position, minimizing the load on the motive means which move the element while nevertheless reducing the possibility of overshoot or hunting about the final position.

Another object of the invention is to make it possible to relieve the load on a bearing which precisely establishes the attitude or posture and the height of a machine tool element, thereby eliminating the drag or friction of such bearing during rapid movement of the machine element, while nevertheless causing said bearing to be reloaded automatically as the element approaches the desired position. The added drag or friction of the bearing during final positioning of the element minimizes overshoot or hunting; and reloading of the bearing before the final position is reached assures that the reloading operation will not shift the element out of its final position.

A further object is to provide for the automatic clamping of a machine tool element as it reaches a desired, predetermined position by imposing an additional load on the bearing for such element.

An additional object is to provide a system in which a machine element is moved from one position to another after each of a plurality of successive machining operations, and in which the element is automatically lifted from, rested on, and clamped by a bearing in a novel and advantageous manner.

Other objects and advantages will become apparent as the following description proceeds, taken in conjunction with the accompanying drawings, in which:

Fig. 3 is an electro-mechanical schematic diagram of an exemplary system for positioning the work table in accordance with the present invention.

While the invention has been shown and will be described in some detail with reference to a particular embodiment thereof, there is no intention that it thus be limited to such detail. On the contrary, it is intended here to cover all modifications, alterations, and equivalents falling within the spirit and scope of the invention as defined by the appended claims.

Figure 1:
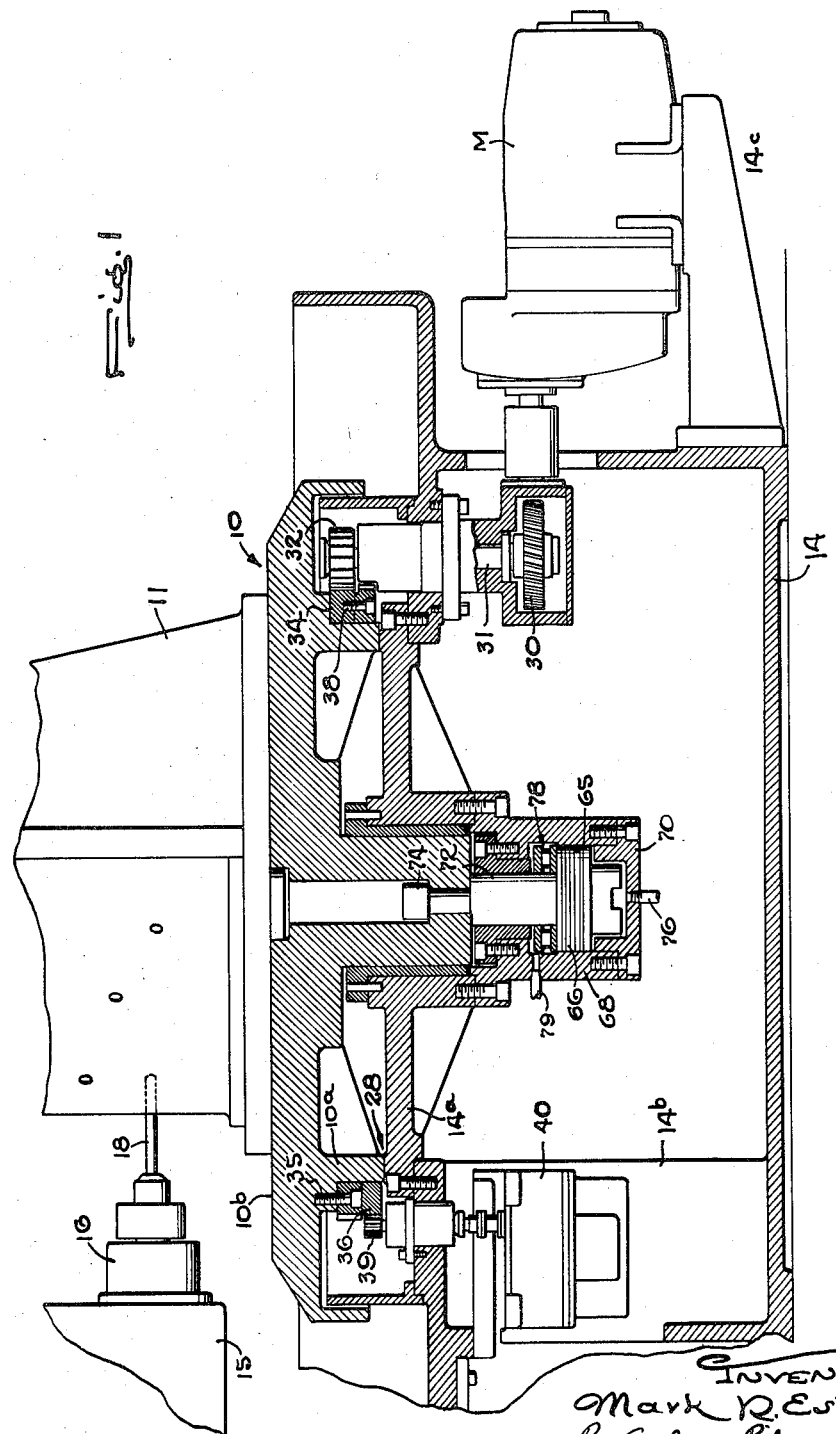
Figure 1 is an elevational view, partly in section, of a work table for a horizontal drilling machine.
Figure 2:
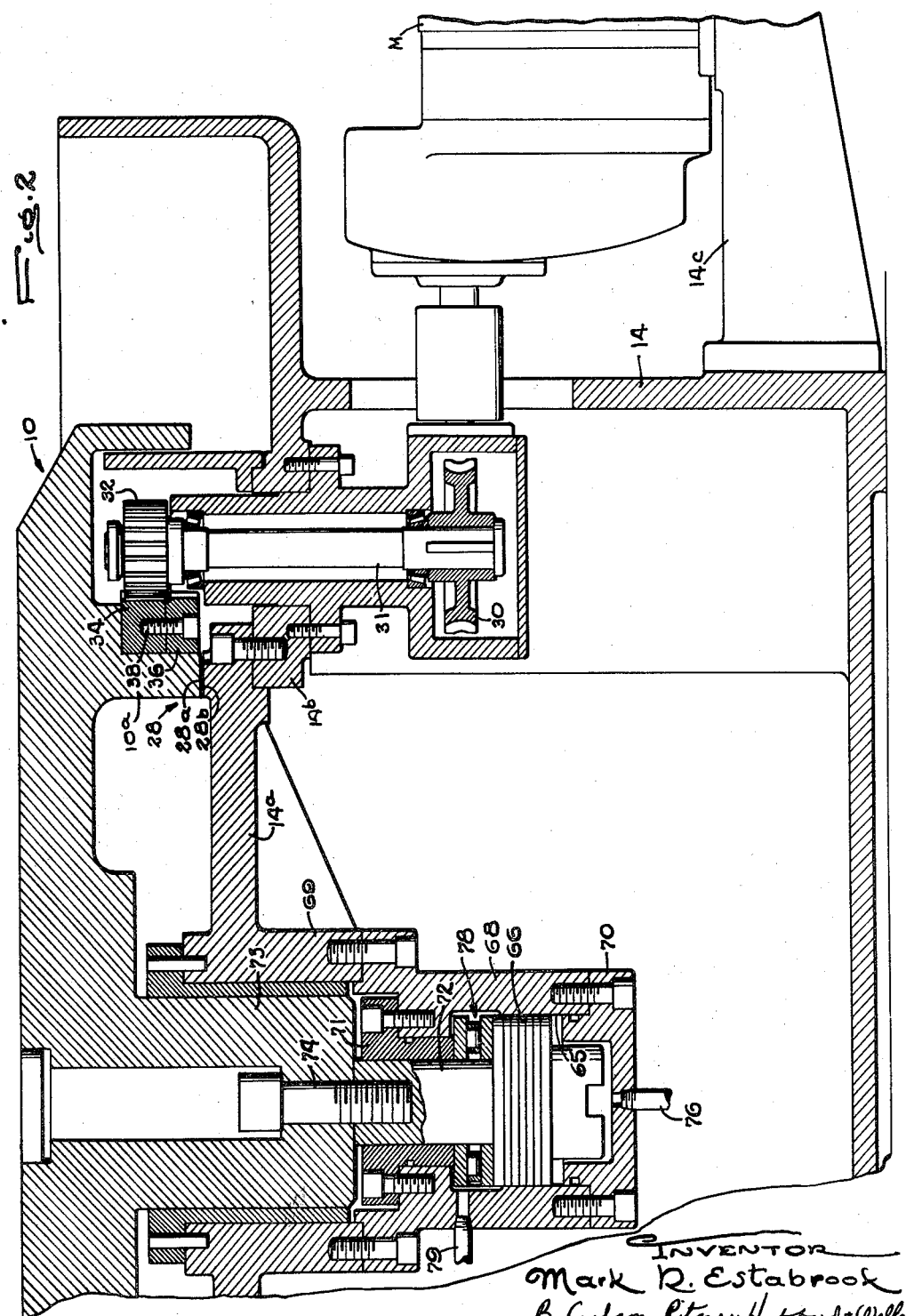
Fig. 2 is an enlarged sectional view corresponding to a portion of Fig. 1.

Referring now to the drawings, Figs. 1 and 2 illustrate a movable machine tool element which is here shown by way of example as a work support or table 10 for a horizontal drilling machine. To make the environment of the invention clear, an exemplary workpiece in the form of a cylindrical jet engine casing 11 is shown locked on the table 10. For drilling a number of holes at specific peripheral locations in the casing 11, the table 10 is angularly indexed to different positions relative to its supporting base 14. A vertically positionable drill head 15 mounting a spindle 16, in which a drill bit 18 is chucked, is moved toward or away from the workpiece after each successive table-indexing movement.

As shown in Fig. 3, the drilling head 15 is connected rigidly with a piston 19 movable in a cylinder 20 connected by conduits 21, 22 through a four-way valve 24 to a fluid pressure source P and a sump S. The valve 24 is normally spring-centered to close both conduits 21 and 22. It includes a forward solenoid FOR which, when energized, causes the valve to supply pressure fluid to the left side of the cylinder 20 while venting the right side, so that the drill head advances the bit 18 toward the workpiece. A return solenoid RET, when energized, causes the valve 24 to supply pressure fluid to the right side of the cylinder 20, while venting the left side, so that the drill head 15 is returned to withdraw the bit 18 from the workpiece.

For sensing when the head is in its "home" position, a dog 25 mounted thereon is arranged to actuate a limit switch LS1 having contacts LS1a and LS1b which are thus respectively opened and closed when the head is fully retracted. In like manner, a dog or bracket 26 is arranged to actuate a limit switch LS2 having normally open contacts LS2a when the head has moved forwardly to advance the bit 18 to its final drilling depth.

Referring again to Figs. 1 and 2, the table 10 is supported on the base 14 for rotation about a vertical axis by a main bearing 28 created by opposed surfaces 28a and 28b precisely lapped on a skirt 10a depending from the table and a web 14a bolted to the base casting 14b. The bearing surfaces 28a, 28b are of sufficient radius and matched smoothness so that their mutual engagement precisely determines not only the height of the table 10 but also its posture or attitude. The bearing 28 makes the upper table surface 10b precisely horizontal and assures that the table rotates about a truly vertical axis. This posturing of the table 10 by the bearing 28 is important in realizing the desired exactness in the location and direction of holes drilled in the workpiece. While an anti-friction bearing may be substituted for the flat bearing surfaces 28a, 28b, the latter are preferred since they give more accurate table posturing.

For rotationally moving the table 10 to successive angular positions, a gear motor M is fixed on an extension 14c of the base 14 and mounts on its output shaft a worm (not shown) which meshes with a worm wheel 30. The latter is fixed on a spindle 31 journaled in the base and carrying a pinion 32 whicth meshes with a circular rack gear 34 fixed by bolts 35 to the periphery of the table skirt 10a. The table motor M is preferably of the D.C. type which can be controlled in speed, thus determining the speed of rotation of the table 10.

In order to govern the motor M in indexing the table 10 precisely to predetermined angular positions, servo control means are employed. As one part of such controls, position feedback selsyn devices are geared to the table, providing an electrical indication of its angular position relative to the desired position. For this purpose, a precision circular gear rack 36 is fixed by bolts 38 to the lower side of the rack 34, and meshed with a pinion 39 drivingly connected to the rotors of two selsyn devices mounted in a housing 40. As shown in Fig. 3, a coarse selsyn device 41 has its rotor and rotor winding 41a mechanically connected to the pinion 39 so as to be rotated in proportion to the angular movement of the work table 10. A second fine selsyn 42 has its rotor and rotor winding 42a connected through step-up gears 44, 45 to the pinion 39 so that it will be driven at a higher speed ratio in timed relation to the angular movement of the table 10. A greater number of selsyn devices for successively coarser or finer position sensing may be employed, if desired.

The selsyn devices 41 and 42 have three-phase stator windings 41b and 42b, respectively. As is well known, for a given phase of the A.C. excitation voltages applied to the stator windings, the rotor windings of such selsyn devices will have induced therein an A.C. signal which is proportional in amplitude to the displacement of the rotor from a given angular position. Thus, by controlling the phase of the A.C. excitation applied to the stator windings 41b and 42b, a given desired table position will be electrically established, and the rotor windings 41a and 42a will have induced therein alternating voltages which are proportional in amplitude to the error between the actual table position and the desired table position.

In the arrangement schematically shown by Fig. 3, successive predetermined angular positions which the table 10 is to occupy during successive drilling operations are designated by numerical information placed in coded binary form on a punched paper tape 50. Each "block" of information on the punched tape 50 is read by a tape reader 51, which supplies electrical signals corresponding to the numerical information to a data processor or "director" 52.

The tape reader 51 and the director 52 are commercially available devices, sold by the General Electric Company of Schenectady, New York. These devices need not be described in detail. It will suffice to observe simply that the director 52 contains a plurality of stepping switches having movable contact arms 54-57 which are set to certain positions corresponding to numerical information on the paper tape 50 sensed by the reader 51. The contact arms thus connect with certain taps on A.C.-excited transformer windings 58 and 59 to pick-off alternating voltages having a particular phase angle, relative to a reference voltage, which is proportional to the desired table position represented by the numerical information on the punched tape. The contact arms 54, 55 and 56, 57 are connected respectively to the selsyn stator windings 42b and 41b. An A.C. error signal proportional in amplitude to, and of one phase or the other depending upon the sense of, the position error of the table 10, will be induced in the rotor windings 41a and 42a when the rotors are displaced from particular angular positions designated by the settings of the contact arms 54-57. When the angular position of the table agrees with that electrically established by the contact arms 54-57, such error signals will be reduced substantially to zero amplitude.

Once the contact arms 54-57 have been set to establish electrically a predetermined, desired angular position for the work table 10, the latter is moved at a relatively rapid rate toward that predetermined position, then slowed down to move at a reduced rate when it comes within a predetermined distance of the desired position, and is finally stopped when it reaches the desired position. This rapid movement of the table toward a desired position, accompanied by slow-down in the table's speed when it approaches to within a pre-established distance of the desired position, is accomplished by connecting the coarse selsyn rotor winding 41a through an amplifier 60 to an amplitude discriminator 61 which controls the energization of an error relay ER. Whenever the alternating error voltage induced in the selsyn winding 41a exceeds a predetermined amplitude, and regardless of its phase, the amplitude discriminator 61 will supply an output voltage to energize the relay ER. The normally open contacts ER1 and ER2 will thus be closed and (assuming the relay contacts RA1 and RA2 to be closed) will thus connect the D.C. table motor M directly to a voltage source. With this, the motor M will be energized with full, rated voltage and will run at its maximum speed to move the table 10 toward the desired position.

Whenever the table 10 comes within a pre-established distance (say, .003 inch as measured along the circumference of the ring gear 36 made sixty inches in diameter) from the predetermined position, then the amplitude of the error signal induced in the selsyn winding 41a will be decreased below a predetermined value. As a result, the amplitude discriminator 61 will de-energize the relay ER. The relay contacts ER1 and ER2 will open, so that the motor M is disconnected from the voltage source. However, when this occurs, the contacts ER3 and ER4 will reclose connecting the output terminals of a servo amplifier 62 to the input terminals of the motor M.

The servo amplifier 62 receives as its input the error signal induced in the fine selsyn rotor winding 42a. Such servo amplifier, as is well known, operates to provide a D.C. output signal which is proportional in magnitude to the amplitude of the A.C. input signal supplied by the rotor winding 42a. Also, the polarity of the D.C. output signal from the servo amplifier 62 agrees in sense with the phase (either 0 degrees or 180°) angle of the error signal induced in the winding 42a. Accordingly, the servo amplifier 62 supplies a D.C. signal to the table motor M which makes the latter run at a relatively slow speed which is proportional to the instantaneous displacement of the table from the final, desired position. When the table 10 reaches precisely the desired position, the output signal from the servo amplifier 62 will be reduced substantially to zero, and the table will come to a halt. A fine error relay FER is connected across the output terminals of the servo amplifier 62. It will be energized whenever the amplifier output signal is appreciable, but will be de-energized as that output signal drops to substantially zero and the table comes to a stop in the desired position.

Referring again to Figs. 1 and 2, the bearing surfaces 28a, 28b are precisely machined to determine accurately the posture of the table 10, as previously mentioned. It is desirable both to minimize wear on such surfaces and to eliminate the frictional load which they might impose on the table motor M, so that the latter can move the table at a fairly rapid rate. For this purpose, means are provided to relieve the load on the bearing 28 while the table 10 is being moved rapidly through relatively great distances. Moreover, once the table has been stopped in a desired position, it is desirable to hold it against movement as a result of tool pressures on the workpiece or other extraneous forces. To do that, means are provided to increase the load on the bearing 28 beyond that occasioned by the weight of the table 10 and workpiece 11, so that the bearing surfaces 28a, 28b are effectively clamped together to prevent rotation of the table.

These functions are accomplished in the illustrated apparatus by means of a cylinder 65 formed in the central portion of the base 14 and cooperatively receiving a piston 66 which is fixed to the underside of the work table 10. The cylinder 65 is defined by a housing 68 bolted to an annular skirt 69 integral with the web 14a, being closed at its lower end by a cap 70 and at its upper end by an annular bushing 71 through which a piston rod 72 slidably projects. The piston rod is fixed at its lower end to the piston 66 and connected by means of a bolt 74 to a depending central portion 73 of the table 10. Both the cylinder 65 and the piston 66 are concentrically disposed about the axis of the rotation for the table 10.

Pressure fluid may be admitted to or vented from the lower end of the cylinder 65 through a conduit 76. The application of pressure fluid through the conduit 76 will raise the piston 66 and thus lift the table 10 sufficiently to separate the bearing surfaces 28a, 28b and relieve the load on the bearing 28. The upward travel of the table 10 need only be slight, e.g., on the order of .004 inch. That upward travel is limited by means of an anti-friction thrust bearing 78 interposed between the upper end of the piston 66 and the lower end of the bushing 71. This thrust bearing withstands the excessive lifting force created by hydraulic pressure in the lower end of the cylinder 65, yet leaves the piston 66 free to rotate within the cylinder. When fluid pressure is present in the lower end of the cylinder 65, and the table 10 lifted slightly to separate the bearing surfaces 28a, 28b, the hydraulic fluid within the cylinder forms a "secondary bearing" supporting the table, and permitting the latter to be angularly indexed relative to the base.

The upper end of the cylinder 65 communicates with a conduit 79 which permits the supply or venting of fluid pressure thereto. When fluid pressure is supplied through the conduit 79, then the piston 66 will be forced downwardly relative to the base, pulling the table 10 downwardly until the bearing surfaces 28a, 28b are firmly clamped together. Under these circumstances, the table is locked in a given angular position.

As shown in Fig. 3, the application of fluid pressure to or venting of fluid from the upper and lower ends of the cylinder 65 is controlled by a four-way valve 80 having a spring-centered plunger 80a. With the plunger so centered, the conduits 76 and 79 are both connected to a fluid sump 81. Upon energization of an associated lifting solenoid L, the valve plunger is shifted to the right so that the conduit 76 is connected with a fluid pressure source or pump 82, while the conduit 79 is connected to the sump 81. Accordingly, the table 10 will be raised to relieve the load on its main bearing 28. Also, upon energization of an associated clamping solenoid C, the plunger 80a of the valve 80 will be shifted to the left, connecting the conduit 79 to the pump 82 and the conduit 76 to the sump 81, so that pressure fluid is supplied to the upper end of the cylinder 65, urging the table downwardly to clamp the bearing surfaces 28a, 28b.

In accordance with the present invention, provision is made to relieve the load on the table bearing 28 as an incident to initiation of movement of the table, and to reload the bearing as the table comes to within a preestablished distance of each desired, predetermined position. Moreover, provision is made to automatically clamp the table bearing 28 when the latter has reached a desired predetermined position, and to release or unclamp the bearing prior to the initiation of the next table movement.

The foregoing is accomplished by the exemplary controls illustrated in Fig. 3, and which can best be described by a narration of one complete cycle of operation. Lines L1 and L2 in Fig. 3 represent the terminals of a suitable voltage source.

Let it be assumed that the reader 51 has read a first block of numerical information from the punched paper tape 50, and has stopped at the end of that block. Also, let it be assumed that the table 10 has been moved to the first desired angular position, corresponding to the settings of the stepping switch contact arms 54–57. The relay ER will be de-energized and the servo amplifier 62 connected in control of the motor M through the contacts ER3 and ER4. Two additional contacts ER5 and ER6 controlled by the relay ER will also be closed. The output signal from the amplifier 62 will be substantially zero, so the relay FER will be de-energized and its contacts FER1 closed.

Prior to the initiation of machining operations, the drill head 15 is in its fully retracted position so that limit switch LS1 is actuated and the contacts LS1a and LS1b are respectively opened and closed. A first control relay CR1 will, therefore, be energized through the contact LS1b and ER6, causing its normally open contacts CR1a and CR1b to be closed, and its normally closed contacts CR1c to be open. Under these conditions, therefore, a clamping time delay relay TDC will be energized through the contacts LS1b, ER5, CR1a and FER1. With the timing period for the relay TDC having expired, its normally open contacts TDC1 and TDC2 will be closed. The latter contacts will, therefore, complete an energization circuit for the clamping solenoid C, and the table will be urged downwardly by the piston 66 to clamp the bearing surfaces 28a, 28b (Fig. 2). All of the other relays and solenoids in Fig. 3 will be at this time de-energized.

To initiate the first drilling operation, a normally open pushbutton start switch ST will be momentarily closed to energize a spindle motor contactor SM through normally closed contacts of a stop pushbutton switch SP. The spindle motor contactor SM will be sealed in through its own normally open contacts SM1, while its three additional contacts SM2 will close to energize a spindle motor M1 which, in well known manner, is connected to rotate the drill spindle 16 and the drilling tool 18.

Also, in response to momentary closure of the start switch ST and the resultant closure of the contacts SM1, the coil of a head advance relay CRA will be energized through normally closed relay contacts CRR1 (controlled by a head return relay CRR) and the now closed contacts TDC1. Pick-up of the relay CRA will result in its being sealed in through its own contacts CRA1, and in closure of its normally open contacts CRA2 and CRA3. The contacts CRA2 thus create an energization circuit through normally closed contacts TDD1 for the forward solenoid FOR, the latter actuating the control valve 24 so that the piston 19 begins to advance the spindle 16 and drill bit 18 toward the workpiece.

As soon as the head advances from its "home" position, the limit switch LS1 is de-actuated, closing its contacts LS1a and opening its contacts LS1b. The latter contacts thus interrupt the energization circuit for the control relay CR1 and the time delay clamp relay TDC. Even though the contacts TDC1 are opened, the advance control relay CRA remains energized through its sealing contacts CRA1. Further, even though the contacts TDC2 open as the head 15 leaves its home position, the clamping solenoid C remains energized through the now closed contacts CRA3.

When the head 15 has advanced sufficiently such that the drill bit 18 has drilled a hole to the desired full depth, the limit switch LS2 will be actuated by the bracket 26, so that contacts LS2a close. This energizes the coil of a dwell time delay relay TDD. This latter relay has one pair of normally closed contacts which are not delayed in their operation; these are the normally closed contacts TDD1 which open immediately to de-energize the forward solenoid FOR. As a result, the valve 24 is centered and the head 15 is immediately brought to a stop.

After a predetermined delay period from the instant of energization of the relay TDD, its contacts TDD2 close to create an energization circuit through the now closed contacts CR1c for a second control relay CR2. Contacts CR2a of the latter relay are thus closed to prepare an energization circuit for a table-raising control relay RA. The latter is not at this time energized, however, because the contacts LS1b are open.

Also, after a predetermined delay of the instant that the relay TDD is energized, its contacts TDD3 will close, these contacts being disposed within the tape reader 51 to initiate the reading of the next block of numerical information on the punched tape 50. Accordingly, the tape reader 51 will supply electrical signals to the director 52, causing the latter to re-position the stepping switch contact arms 54–57 so that the latter designate the next predetermined angular position to which the table 10 is to be moved. As soon as the stepping switch arms 54–57 are re-positioned, error signals will be induced in the selsyn rotor windings 41a and 42a, so that the error relay ER will be energized, thereby closing the contacts ER1, ER2, while opening the contacts ER3, ER4, ER5, and ER6. Despite closure of the contacts ER1 and ER2, the table motor M remains disconnected from the D.C. voltage source because the contacts RA1 and RA2 are at this time still open.

During this delay interval created by relay TDD, the drilling bit 18 will remain stationary at its point of farthest advance, thus cleaning up the hole which has been drilled. At the end of the dwell period, contacts TDD4 close to energize the return relay CRR through the now closed limit switch contacts LS1a. Pick-up of the relay CRR results in its being sealed in around the contacts TDD4 by closure of its own contacts CRR3. The contacts CRR1 open to drop out relay CRA, so the contacts CRA3 open to de-energize the clamping solenoid C.

Simultaneously, the return relay contacts CRR2 close to energize the return solenoid RET, which thus shifts the valve 24 to cause the hydraulic actuator 19, 20 to retract the head 15 away from the workpiece. As soon as the head 15 starts retracting, the limit switch LS2 will be de-actuated and its contacts LS2a opened. Accordingly, the dwell time delay relay TDD is dropped out. Its contacts TDD2 open, but relay CR2 remains energized through its own sealing contacts CR2b. Also, the contacts TDD4 open, but the relay CRR remains sealed in through its own contacts CRR3. Still further, the contacts TDD1 reclose, but the forward solenoid FOR cannot be energized because the contacts CRA2 are now open.

Thus, when the drilling head 15 reaches its point of farthest advance, it dwells for a predetermined time and then begins moving rearwardly toward its home position. During the dwell period and while the head 15 is returning to its home position, the tape reader 51 is reading the next block of information, setting up the stepping switch arms in the director 52 and causing the selsyns 41 and 42 to generate error signals.

When the drill head returns fully to its home position, the limit switch LS1 is again actuated. Its contacts LS1a re-open to de-energize the return relay CRR. This open the contacts CRR2, de-energizing the return solenoid RET so that the valve 24 is centered and the head 15 is brought to a halt. Moreover, actuation of the limit switch LS1 results in closure of its contacts LS1b so that the raise relay RA is energized through the now closed contacts CR2a.

Pick-up of the raise relay RA results in closure of its contacts RA3 and the energization of the limiting solenoid L. This solenoid thus shifts the valve 80, permitting the latter to supply pressure fluid to the lower end of the cylinder 65, thus lifting the work table 10 to unload its main bearing 28. Additionally, pick-up of the relay RA results in closure of its contacts RA1 and RA2, completing the circuit from the D.C. voltage source to the table motor M through the already closed contacts ER1 and ER2. Accordingly, the table motor M drives the table 10 at full speed toward the second predetermined angular position, at which the next hole is to be drilled in the workpiece.

When the table approaches to within a pre-established distance of the desired second position, the error signal induced in the coarse selsyn rotor winding 41a will become so small that the amplitude discriminator 61 will de-energize the error relay ER. The error relay contacts ER1, ER2 thus open to disconnect the table motor M from the voltage source, while the contacts ER3 and ER4 close to connect the output terminals of the servo amplifier 62 to the input terminals of the motor M. The relay FER will now be energized because the error signal output from the amplifier 62 is appreciable. The contacts FER1 are opened to prevent premature energization of the delay relay TDC. Under these circumstances, therefore, the servo amplifier energizes the motor M to run at a speed, and in the proper direction, which is proportional to the error signal induced in the fine selsyn rotor winding 42a. The motor M thus runs at a slower rate until it finally reaches the desired position and the error signal is reduced substantially to zero. The table stops and the relay FER is de-energized.

When the table has approached to within, say, .003 inch of the desired position, the relay ER will be de-energized, as described above. Thus, its contacts ER5 and ER6 will be closed at that time. Since the limit switch contacts LS1b are now closed, closure of the contacts ER6 will create an energization path for the control relay CR1, causing the latter to pick-up. The contacts CR1c thus open to de-energize the control relay CR2, and the contacts CR2a of the latter open to de-energize the raise solenoid RA. This, in turn, opens the contacts RA3 to de-energize the lifting solenoid L so that the valve 80 is centered and the table is lowered until its weight, and that of the workpiece, is supported by the main table bearing 28. Therefore, as the table 10 is reduced from its rapid rate of motion to its slow rate of motion in response to the relay ER being de-energized, the lower end of the piston 65 is vented to let pressure fluid drain therefrom, and the table is lowered onto its bearing 28. As the table undergoes its final, slow positioning movement, with the motor M being controlled by the servo amplifier 62, the friction of the main bearing 28 creates an added damping force which tends to minimize the possibility of overshooting or hunting about the desired final position of the table as the motor M and the table come to a stop.

It will also be apparent that when the table is converted from a rapid to a slow rate of motion by de-energization of the error relay ER, the resulting closure of the contacts ER5 and CR1a will prepare an energization circuit for the clamp time delay relay TDC. As the table M comes to a stop, the relay FER is de-energized, and the contacts FER1 close to energize the delay relay TDC. After a predetermined time delay which is made sufficiently long to assure that the table reaches its final position even though it overshoots slightly and returns, the delay relay contacts TDC2 close to energize the clamping solenoid C. This shifts the valve 80 to supply fluid pressure through the conduit 79 to the upper end of the cylinder 65, thus pulling downwardly on the piston 66 and the table 10. The table is again locked in a desired, predetermined position. Moreover, a predetermined time period after the energization of the relay TDC, its contacts TDC1 will close to again energize the advance relay CRA, the latter sealing in through its contacts CRA1 and closing its contacts CRA2 to energize the forward solenoid FOR. With this, the drill head 15 will begin its forward motion toward the workpiece, and the cycle described above will be repeated.

It will be apparent from the foregoing that the work table 10 will be angularly indexed to predetermined positions defined by successive blocks of numerical information on the punched paper tape 50. The table is moved rapidly toward each such predetermined position until it comes within a pre-established, finite distance of that position, after which the table is moved at a slower rate under the proportional control of the servo amplifier 62. During the rapid movement of the table 10, the latter is automatically lifted to relieve the load on its bearing 28 by energization of the lifting solenoid L and actuation of the valve 80. Yet, as soon as the table motion is converted from a rapid rate to a slow rate, the lifting solenoid L is de-energized, so that the table is again lowered onto its bearing 28.

While the table is being rapidly moved through relatively great distances from one position to the next, therefore, it is lifted to relieve the load on the bearing 28, so that wear on the bearing surfaces 28a, 28b will be minimized. Moreover, the speed with which the table can be moved, for a given size of the D.C. table motor M, will be increased because the drag or friction of the bearing 28 is substantially eliminated during rapid motion through relatively great distances. When the bearing 28 is relieved of its load, the fluid which urges the piston 66 upwardly forms a "secondary" bearing which has very little frictional resistance.

But beyond that, such frictional drag as the bearing 28 may create is advantageously utilized in the present case by controls which automatically reload that bearing slightly before the table reaches each successive predetermined position. Reloading the bearing causes damping in the servo system so that the table is less likely to overshoot or hunt about the final stopping point. Also, if the table were finally stopped in the desired position before the bearing 28 were loaded by lowering the table, the very process of lowering the table might produce some angular rotation thereof, so that servo amplifier 62 and motor M would have to again finally position the table in the desired location. This difficulty is avoided because the table is here lowered onto its main bearing 28 before the table has reached its final position.

I claim as my invention:

1. In a machine tool, the combination comprising a movable machine tool element, a base, bearing means between said element and base affording freedom of movement of the latter relative to the former, means for relieving the load on said bearing means, means for moving said element to a predetermined position relative to said base, means for actuating said load-relieving means as an incident to initiation of element movement, and means for de-actuating said load-relieving means in response to said element approaching to within a pre-established finite distance of said predetermined position.

2. In a machine tool, the combination of a work support, a base, a bearing between said support and base, means for lifting said support to relieve the load on said bearing, said lifting means including a secondary bearing to afford movement of said support while lifted, means for moving said support successively to predetermined positions relative to said base, means for actuating said lifting means as an incident to initiation of each support movement, and means for de-actuating said lifting means in response to said support approaching to within a pre-established finite distance of each said predetermined position.

3. In a machine tool, the combination of a work support, a base, a bearing between said support and base, means for lifting said support to relieve the weight load on said bearing, said lifting means including a secondary bearing to afford movement of said support while lifted, means for moving said support to a predetermined position including controls for moving the support at a relatively rapid rate until it comes within a pre-established distance from the predetermined position and then at a relatively slow rate until it reaches the predetermined position, means for actuating said lifting means prior to movement of said support, and means for de-actuating said lifting means in response to said controls reducing the support motion to said slow rate, whereby the friction of said bearing reduces hunting of the support about said predetermined position and lowering of said support cannot alter the final position thereof.

4. In a machine tool, the combination comprising a base, a work table, bearing surfaces on said base and table to transfer the weight of the latter to the former while permitting relative rotation thereof about a vertical axis, a vertically disposed cylinder formed in the central portion of said base, a piston rotatably disposed in said cylinder and connected with the central portion of said table, means for rotating said table to a predetermined position relative to said base, means for supplying pressure fluid to the lower end of said cylinder to lift the table and relieve the load on said bearing surfaces as an incident to actuation of said rotating means, and means for venting the lower end of said cylinder to re-load said bearing surfaces in response to said table coming to within a pre-established finite distance from said predetermined position, whereby said bearing surfaces support the weight of said table only when the latter is stationary or has almost reached a desired stationary position.

5. In a drilling machine, the combination comprising a work table, a base, bearing surfaces on said table and base to transfer the weight of the former to the latter while permitting relative rotation thereof about a vertical axis, a cylinder formed in the central portion of said base, a piston rotatably disposed within said cylinder and connected with the central portion of said table, means for supplying pressure fluid to the lower end of said cylinder to lift the table and separate said bearing surfaces, means including a motor for rotating said table relative to said base, means for controlling said motor to move said table at a rapid rate until it comes within a pre-established finite distance from a desired, predetermined position and then at a slow rate until it reaches said predetermined position, means for actuating said fluid-supplying means as an incident to initiation of movement of said table by said motor, and means for de-actuating said fluid-supplying means in response to said table coming within said pre-established finite distance of said predetermined position.

6. In a machine tool, the combination comprising a base, a work table, a bearing journaling said table for rotation about a vertical axis relative to said base, a cylinder in said base concentric with said axis, a piston fixed to said table and slidable in said cylinder, a motor for rotating said table, control means for said motor to move the table at a rapid rate toward a predetermined position and then at a slow rate to said position after the position error has been reduced to a predetermined finite magnitude, means for supplying pressure fluid to the lower end of said cylinder in response to the initiation of table movement to thereby lift the weight of the latter off said bearing, and means responsive to the table being driven at said slow rate for venting the lower end of said cylinder to lower the weight of said table onto said bearing.

7. In a machine tool, the combination comprising a movable machine tool element, a base, bearing means between said element and base affording freedom of movement of the latter relative to the former, means for relieving the load on said bearing means, means for increasing the load on said bearing means above the load created by the weight of said element, means for moving said element to a predetermined position relative to said base, means for actuating said load-relieving means as an incident initiation of element movement, means for de-actuating said load-relieving means in response to said element approaching to within a pre-established finite distance of said predetermined position, and means for actuating said load-increasing means when said element reaches said predetermined position to clamp the element to the base.

8. In a machine tool, the combination of a work support, a base, a bearing between said support and base, means for lifting said support to relieve the load on said bearing, said lifting means including a secondary bearing to afford movement of said support while lifted, means for pulling downwardly on said support to increase the load on said bearing beyond that created by the weight of said support, means for moving said support successively to predetermined positions relative to said base, means for actuating said lifting means as an incident to initiation of each movement, means for de-actuating said lifting means in response to said support approaching to within a pre-established finite distance of each said predetermined position, means for actuating said pulling means as said support reaches each said predetermined position, and means for de-actuating said pulling means prior to the initiation of the next movement of said support.

9. In a machine tool, the combination of a work support, a base, a bearing between said support and base, means for lifting said support to relieve the weight load on said bearing, said lifting means including a secondary bearing to afford movement of said support while lifted, means for pulling downwardly on said support to increase the load on said bearing beyond that created by the weight of said support, means for moving said support to a predetermined position including controls for moving the support at a relatively rapid rate until it comes within a pre-established distance from the predetermined position and then at a relatively slow rate until it reaches the predetermined position, means for actuating said lifting means as an incident to initiation of movement of said support, means for de-actuating said lifting means in response to said controls reducing the support motion to said slow rate, time delay means responsive to the reduction of support motion to said slow rate for actuating said pulling means a predetermined period after such reduction, and means for de-actuating said pulling means prior to the next movement of said support.

10. In a machine tool, the combination comprising a base, a work table, bearing surfaces on said base and table to transfer the weight of the latter to the former while permitting relative rotation thereof about a vertical axis, a vertically disposed cylinder formed in the central portion of said base, a piston rotatably disposed in said cylinder and connected with the central portion of said table, means for rotating said table to a predetermined position relative to said base, means for supplying pressure fluid to the lower end of said cylinder to lift the table and relieve the load on said bearing surfaces when said rotating means are actuated, means for venting the lower end of said cylinder to re-load said bearing surfaces with the weight of said table in response to said table coming to within a pre-established distance from said predetermined position, means for supplying pressure fluid to the upper end of cylinder to increase the load on said bearing surfaces as said table reaches said predetermined position, and means for venting the upper end of said cylinder prior to the next movement of said table.

11. In a drilling machine, the combination comprising a work table, a base, bearing surfaces on said table and base to transfer the weight of the former to the latter while permitting relative rotation thereof about a vertical axis, a cylinder formed in the central portion of said base, a piston rotatably disposed within said cylinder and connected with the central portion of said table, first controllable means for supplying pressure fluid to the lower end of said cylinder to lift the table and separate said bearing surfaces, second controllable means for supplying pressure fluid to the upper end of said cylinder to increase the load on said bearing surfaces, means including a motor for rotating said table relative to said base, means for controlling said motor to move said table at a rapid rate until it comes within a pre-established distance from a desired predetermined position and then at a slow rate until it reaches said predetermined position, means for actuating said first fluid-supplying means when said table is moved by said motor, means for de-actuating said first fluid-supplying means in response to said table coming within said pre-established distance of said predetermined position, means for actuating said second fluid-supplying means as said table reaches said predetermined position, and means for de-actuating said second fluid-supplying means prior to the next movement of said table.

12. In a machine tool, the combination comprising a base, work table, a bearing journaling said table for rotation about a vertical axis relative to said base, a cylinder in said base concentric with said axis, a piston slidable in said cylinder and having a piston rod connected to the underside of said table, a motor for rotating said table, servo controls for said motor to move the table at a rapid rate toward a predetermined position and then at a slow rate to said position after the error has been reduced to a predetermined magnitude, means for supplying pressure fluid to the lower end of said cylinder in response to the initiation of table movement to thereby lift the weight of the latter off said bearing, means responsive to the table being driven at said slow rate for venting the lower end of said cylinder to lower the weight of said table onto said bearing, means for supplying pressure fluid to the upper end of said cylinder a predetermined time period after said table is driven at said slow rate to clamp said bearing after the table has reached said predetermined position, and means for venting the upper end of said cylinder before said table is again moved.

13. In a machine tool, the combination comprising a work table, a base, a bearing journaling said table on said base for rotation about a vertical axis, means for increasing the load on said bearing to clamp the table to the base, servo control means for rotationally driving said table initially at a rapid rate toward a predetermined position and then at a slow rate when the table approaches within a pre-established distance from said predetermined position, a time delay device, means for actuating said time delay device as an incident to said servo control means reducing table movement from said rapid to said slow rate, means responsive to said time delay device for actuating said load-increasing means when said table has reached said predetermined position, and means for de-actuating said load-increasing means prior to the next movement of said table.

14. In a machine tool, the combination comprising a movable machine tool element, a base, a bearing between said element and said base, a motor for moving said element relative to said base, means receptive to successive sets of numerical information for controlling said motor to drive said element to successive predetermined positions, means responsive to initiation of each movement of said element for relieving the load on said bearing, means for sensing when the element has come within a pre-established small distance from each predetermined position, and means responsive to said sensing means for re-loading said bearing during the period in which said element is moved through said distance.

15. In a machine tool, the combination comprising a movable work support, a base, a bearing between said element and said base, a motor for moving said element relative to said base, a cutter tool, means for advancing and means for retracting said tool toward and away from said support to perform successive operations on a workpiece, means receptive to successive sets of numerical information for controlling said motor to drive said support to successive predetermined positions, means responsive to said tool being fully retracted for energizing said motor to initiate movement of said support from one position to the next, means actuated simultaneously with said movement initiation for lifting said support to relieve the weight load on said bearing, means for sensing when the support has come to within a pre-established finite distance from each predetermined position, means responsive to said sensing means for lowering said support to reload said bearing, means responsive to said support reaching each predetermined position for actuating said tool advancing means, means for actuating said tool retracting means in response to said cutter tool being fully advanced, and means for supplying the next set of numerical information to said motor controlling means while said cutter tool is being retracted.

References Cited in the file of this patent

UNITED STATES PATENTS

| 1,737,002 | De Vlieg | Nov. 26, 1929 |
| 1,968,990 | Carlson | Aug. 7, 1934 |

FOREIGN PATENTS

| 14,691 | Great Britain | A.D. 1913 |